Sept. 24, 1946.  H. A. HERZIG  2,408,067
INERTIA ABSORBER
Filed Nov. 30, 1943
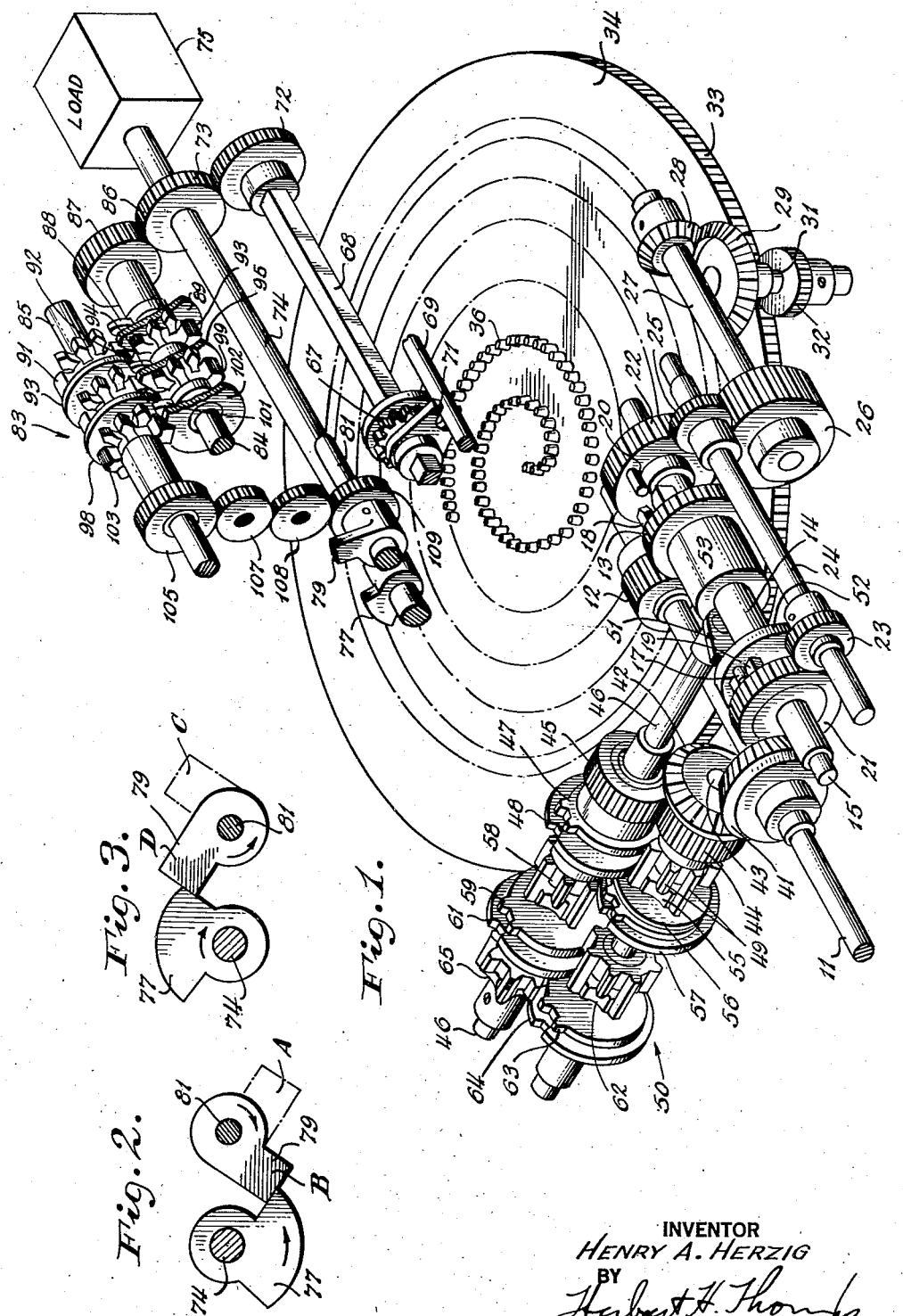
INVENTOR
HENRY A. HERZIG
BY
Herbert H. Thompson
his ATTORNEY.

Patented Sept. 24, 1946

2,408,067

UNITED STATES PATENT OFFICE 2,408,067

INERTIA ABSORBER

Henry A. Herzig, Port Washington, N. Y., assignor to Sperry Gyroscope Company, Inc., a corporation of New York Application November 30, 1943, Serial No. 512,319

6 Claims. (Cl. 192—4)

This invention concerns an inertia absorbing device for use with a reversing mechanism to absorb the inertia of a load during operation of the reversing mechanism, thereby relieving the driving apparatus from inertia forces occurring when the direction of the load is reversed.

A major object of the invention is to provide a mechanism operable synchronously with a reversing mechanism for absorbing the inertia of a load during the reversing operation.

Another object of the invention is to provide an inertia absorber actuated synchronously with an intermittently operated reversing mechanism for stopping movement of an output member to absorb the inertia of a load during the reversing operation.

A further object of the invention is to provide a computing mechanism with an inertia absorber actuated synchronously with an intermittently operable reversing mechanism to absorb the inertia of the load driven by the computing mechanism during the reversing operation.

Other objects and advantages will become apparent from the following specification taken in connection with the accompanying drawing, wherein Fig. 1 is a perspective view of a sine computing mechanism embodying the invention in a preferred form, some parts being broken away for purposes of clearness;

Fig. 2 is a side elevation of the stop mechanism in Fig. 1 showing the stop members positioned for stopping rotation of the output shaft in one direction; and Fig. 3 is a similar side elevation of the stop mechanism, but showing the stop members positioned for stopping rotation of the output shaft in the opposite direction.

The present invention is particularly useful in connection with trigonometric computing devices such as those for computing a particular trigonometric function of an angle. One device for determining the trigonometric function of an angle is a cam which may be rotated, or otherwise moved, according to a particular angle. By properly laying out the surface of the cam, it may move a follower according to any predetermined function of the angle according to which the cam is rotated.

For example, from trigonometry it is known that the sine value of an angle increases from zero to unity for angles of from 0 to 90 degrees, and decreases from unity to zero for angles between 90 and 180 degrees. It is sometimes possible to provide a cam surface which will compute the sine angles over a complete 360° range. In other cases, it is necessary to move the cam in one direction from 0° to 90°, then reverse the cam and move it in the opposite direction from 90° to 180°.

The present invention is particularly useful in connection with the latter type of mechanism. Since the speed of movement of the cam remains constant, providing the rate of change of the input angle is constant, but only the direction of the output is changed, any mechanical load driven by the output of the cam must be reversed from a given speed in one direction to the same speed in an opposite direction. Obviously this places a very heavy load on the computing device.

According to the present invention, the inertia absorber operates synchronously with the reversal of direction to absorb the inertia of the load independently of the computing device. As applied to a trigonometric computing device, the reversing mechanism operates intermittently for each 90° change in the input angle. The inertia absorber, in the form of a stop cooperating with the output shaft, operates synchronously with the operation of the reversing mechanism to arrest movement of the output shaft thereby absorbing the inertia of the load without interfering with the normal operation of the computing device.

The invention is illustrated in the drawing as applied to a sine computing unit utilizing a pin cam which is rotated according to any given angle, and drives an output shaft according to the sine of the input angle. The direction of rotation of the pin cam must be changed for each ninety degrees of the input angle. Obviously, the output member and its load is reversed at the same time. Without the provision of the inertia absorber, the pins on the cam would have to absorb the inertia forces of the load which are quite large when it is realized that under certain conditions, the entire apparatus changes from a given speed in one direction to a corresponding speed in the opposite direction.

As shown in Fig. 1, an input shaft 11 is driven according to an angle the sine of which it is desired to compute. Such a device may for example be driven according to the azimuth angle of a sight for use in aiming guns or other objects toward a given target. In such a case, the sight may be continuously rotated in one direction for any number of revolutions, or it may be rotated first in one direction and then in the opposite direction. In any case, the shaft 11 is constantly positioned according to the azimuth angle as measured from a given reference. The shaft 11 carries a gear 12 which meshes with a driving gear 13 on a sleeve 14 that is rotatable on, and shiftable longitudinally of a shaft 15. Clutch engaging members 17 and 18, driven by the sleeve 14, are adapted to mesh with corresponding clutch members 19 and 20 on gears 21 and 22, respectively, which are also rotatable on the shaft 15.

The gear 21, when the clutch members 17 and 19 are engaged, drives through gear 23 on shaft 24 which rotates gear 25 to drive a broad-faced gear 26. The gear 26 is keyed to shaft 27 to drive bevel gear 28 which operates through bevel gear 29, shaft 31 and pinion 32 that meshes with a gear 33 on the periphery of a pin cam 34.

When the clutch members 18 and 20 are engaged, as by shifting of the sleeve 14, the gear 22 drives directly through the gear 26 and shaft 27 to rotate pinion 32 in the opposite direction to its previous direction of rotation, whereby the direction of rotation of pin cam 34 is reversed. As shown in the drawing, pins 36 on the face of the pin cam 34 are arranged in spiral fashion to provide the desired sine function.

The reversing mechanism is actuated, as will be explained, according to the position of the input shaft 11, whereupon the sleeve 14 is shifted longitudinally of the shaft 15 to cause the shaft 11 to drive the pin cam 34 in one direction or another, depending upon the angular input represented by the shaft 11. As previously pointed out, the direction of rotation of pin cam 34 must be reversed for each ninety degree change in the input angle; that is, the pin cam 34 is driven in one direction for an input angle of from 0° to 90°, but reversed for angles from 90° to 180°. This procedure continues for each ninety degree change in the input angle.

In order to operate the reversing mechanism at each ninety degree angle, the input shaft 11 has a bevel gear 41 meshing with a bevel gear 42 that is freely rotatable on shaft 43 and drives a gear 44 which, in turn, rotates a gear 45 that is rotatable on a shaft 46 arranged parallel to the shaft 43. The gear 45 operates through a Geneva accumulator mechanism, designated generally at 50, which intermittently turns the shaft 46. The shaft 46 thus turns reversing member 51 which engages collars 52 and 53 on the sleeve 14 to shift the sleeve together with the driving gear 13 longitudinally of the shaft 15. The gear 45 is keyed to a segment gear 47 and a locking disc 48 which cooperate in a conventional manner with teeth 49, 49 to intermittently turn Geneva gear 55.

The Geneva gear 55 is fixed to another segment 56 and locking disc 57 to intermittently operate Geneva gear 58, which, in turn, operates another Geneva mechanism including segment gear 59, locking disc 61 and gear 62. The gear 62 also actuates a Geneva mechanism including segment gear 63, locking disc 64 and gear 65, which is fixed on shaft 46. By appropriately arranging the gear ratios of the driving gear and the Geneva accumulator mechanism, it is possible to turn the shaft 46 through an angle of 180° to actuate the reversing member 51 thereby reversing the direction of the drive for the pin cam 34. As shown in the drawing, the reversing member 51 is turned through 180° in two steps of one-fourth of a revolution each for each ninety degree change in the input angle. The reversing member 51 thereby actuates the reversing mechanism to reverse the drive of the pin cam for each ninety degrees of the input angle represented by the position of shaft 11.

The pins 36 on the pin cam 34 drive a follower gear 67 that is mounted on a square shaft 68 and is slidable longitudinally thereof. In order to support the follower gear 67, a guide rod 69 may be arranged to engage a guide member 71 slidable on the square shaft 68 to guide movement of the follower gear 67 as it slides along the shaft 68 to follow the spirally arranged pins 36.

The shaft 68 drives through gears 72 and 73 to rotate an output shaft 74 which may be utilized to drive any desired load represented diagrammatically at 75. A stop member 77, in the form of a segmental projection, is mounted on the shaft 74 and is adapted to engage an intermittently actuated stop 79 which is mounted on a shaft 81 for intermittent movement synchronously with the operation of the reversing mechanism to stop rotation of the output shaft 74 as well as movement of the load 75.

The mechanism for intermittently actuating the stop 79 consists of a Geneva accumulator mechanism 83 that is similar to the accumulator 50 previously described. It consists of a series of Geneva mechanisms carried on parallel shafts 84 and 85. The input of the Geneva accumulator 83 is driven from shaft 74 as by gears 86 and 87, which rotate segmental gear 88 and locking disc 89, which cooperate with Geneva gear 91 on shaft 85, to intermittently rotate segmental gear 92 and locking disc 93 of a second Geneva mechanism. The segmental gear 92 rotates Geneva gear 93 on the shaft 84, that drives segmental gear 94 and locking disc 95 which operate a Geneva gear 96 on the shaft 85. This Geneva gear 96 drives still another segmental gear 97 and locking disc 98 which operate a Geneva gear 99 on the shaft 84. This latter Geneva gear intermittently rotates segmental gear 101 and locking disc 102, which cooperate with Geneva gear 103 to intermittently turn spur gear 105 on the shaft 85.

From this description it will be apparent that the Geneva accumulator 83 is driven by the output shaft 74 and operates to intermittently turn the gear 105 through approximately one quarter of a revolution for a given number of revolutions of the output shaft 74. The gear 105 drives through idle gears 107 and 108 to turn a gear 109 which is fixed to the stop 79 on the shaft 81. In this manner, the stop 79 is also intermittently turned through approximately one fourth of a revolution for a given number of revolutions of the output shaft 74.

When the output shaft 74 is rotated in a counterclockwise direction, as shown by the arrow in Figs. 1 and 2, the stop 79 is intermittently turned in a clockwise direction until the output shaft 74 reaches a position at which the reversing mechanism is actuated to reverse the direction of movement of the pin cam 34. At this instant, the stop 79 is operated by the Geneva mechanism 83 to move from position A, as shown in dotted line in Fig. 2, to position B, where it engages the segmental stop engaging member 77.

As the stop engaging member 77 contacts the stop 79, the inertia of the load 75 is absorbed by the two stop members 77 and 79, and is not transmitted to the pins 36 on the pin cam 34 when it reverses its direction of rotation.

When the reversing mechanism reverses the direction of rotation of the pin cam 34, it also reverses the direction of the output shaft 74 and the load 75, thereby immediately operating through the Geneva accumulator mechanism to rotate the stop 79 from position B to position A (Fig. 2). As the output shaft 74 continues to rotate in the opposite direction, that is, a clockwise direction as shown by the arrow in Fig. 3, it actuates the Geneva accumulator mechanism 83 to rotate the shaft 81 and stop 79 in a counter-clockwise direction to position C, as shown in dotted line in Fig. 3.

When the output shaft 74 has been rotated in a clockwise direction to a position at which the reversing mechanism again changes the direction of rotation of the pin cam 34, which corresponds to the center position of the follower gear 69 on the pins 36, the Geneva accumulator 83 rotates the stop 79 from position C, to position D, as shown in Fig. 3, where it engages the stop engaging member 77 to absorb the inertia of the load during the operation of the reversing mechanism. As soon as the direction of rotation of the pin cam 34 is again reversed it begins rotating output shaft 74 in a counter-clockwise direction so the stop member 79 is moved by means of the Geneva accumulator mechanism 83 from position D to position C, from which point it is intermittently turned until it reaches stop position B, as shown in Fig. 2, when the reversing mechanism is again operating.

From the foregoing description it will be apparent that the input shaft 11 may continuously rotate in either direction. As it reaches a point in its rotation corresponding to an input angle of 90°, reversing member 51 is actuated by the Geneva accumulator 50 operating the reversing mechanism to reverse the direction of rotation of the pin cam 34 together with output shaft 74, relative to the direction of rotation of input shaft 11. At the instant of operation of the reversing mechanism, stop 79 moves into position to contact stop engaging member 77 to absorb the inertia of the load 75 by stopping the movement of output shaft 74. This relieves the force of the load's inertia from the pins 36 on the pin cam 34.

While the invention is described in connection with a pin cam trigonometric computing mechanism for computing a sine of a given input angle, it should be understood that it may be applied to other types of mechanisms, in which it is desired to intermittently reverse the direction of movement of an inertia load. The operation of the inertia absorber stops synchronously with the operation of the reversing mechanism relieves the strain due to the inertia of the load from the driving mechanism and avoids damage thereof.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In a computing mechanism of the character described, the combination of an input member, a pin cam driven by said input member, a reversing mechanism connected between said input member and said pin cam for changing the direction of movement of said pin cam relative to said input member, an accumulator device driven by said input member for intermittently actuating said reversing mechanism to change the direction of movement of said cam, an output member driven by said pin cam, stopping means for arresting movement of said output member, and an accumulator device driven by said output member for operating said stopping means synchronously with the operation of said reversing mechanism to arrest movement of said output member during the reversing operation.

2. In an apparatus of the character described, the combination of an input member, a pin cam driven thereby, a reversing mechanism connected between the input member and pin cam for changing the direction of movement of the pin cam relative to that of the input member, an output shaft driven from the pin cam, means for absorbing the inertia of the output shaft on the operation of the reversing mechanism comprising a first stop member positioned by the output shaft, an accumulator driven by the output shaft, a second stop member intermittently driven by the output of the accumulator into the path of the first stop member, the accumulator being synchronized with the reversing mechanism and effective on the reversing operation thereof to position the second stop member so as to be engaged by the first stop member, thereby arresting the movement of the first stop member and the output shaft.

3. In an apparatus of the character described, the combination of an input member, a pin cam driven thereby, a reversing mechanism connected between the input member and pin cam for changing the direction of movement thereof relative to the direction of the input member, an output shaft driven from the pin cam, a first stop member fixed to the output shaft, a Geneva accumulator driven by the output shaft, and a second stop member driven by the accumulator disposed to be actuated thereby intermittently into the path of the first stop member, the accumulator being synchronized with the reversing mechanism and effective on actuation thereof to position the second stop member so as to be engaged by the first stop member, thereby arresting the movement of the output shaft.

4. In an apparatus of the character described, the combination of an input member, a pin cam driven thereby, a reversing mechanism connected between the input member and pin cam for changing the direction of movement of the pin cam relative to that of the input member, an output shaft driven from the pin cam, means for absorbing the inertia of the output shaft on the operation of the reversing mechanism comprising a first stop member fixed to the output shaft, an accumulator comprising a Geneva mechanism driven by the output shaft, a second stop member intermittently driven by the output of the accumulator into the path of the first stop member, the accumulator being synchronized with the reversing mechanism and effective on the operation thereof to position the second stop member so as to be engaged by the first stop member, thereby arresting the movement of the first stop member and the output shaft.

5. In an apparatus of the character described, the combination of an input member, a pin cam driven thereby, a reversing mechanism connected between the input member and pin cam for changing the direction thereof with respect to the input member, an output shaft driven from the pin cam, means for absorbing the inertia of the output shaft on reversal of the direction of the pin cam comprising a first stop member fixed to the output shaft, an accumulator comprising a Geneva mechanism driven by the output shaft, a second stop member driven in a direction opposite to that of the first intermittently into the path of the first stop member by the output of the accumulator, the accumulator being effective at the time of the reversing operation of the reversing mechanism to position the second stop member to arrest the first and thereby arrest the output shaft.

6. In a computing mechanism for computing functions of angles, the combination of an input member displaced in accordance with the angle of which the function is to be computed, a pin cam laid out according to the function to be computed displaced by the input member, a reversing mechanism connected between the input member and the pin cam for changing the direction of the pin cam relative to the input member, an accumulator device driven by the input member for intermittently actuating the reversing mechanism to change the direction of movement of the cam, an output member driven by the pin cam, stopping means for arresting the movement of the output member, and an accumulator device driven by said output member for operating the stopping means synchronously with the operation of the reversing mechanism to arrest movement of the output member during the reversing operation.

HENRY A. HERZIG.